United States Patent [19]

Hayashi

[11] 4,448,083

[45] May 15, 1984

[54] DEVICE FOR MEASURING COMPONENTS OF FORCE AND MOMENT IN PLURAL DIRECTIONS

[75] Inventor: Junichi Hayashi, Akashi, Japan

[73] Assignee: Yamato Scale Company, Ltd., Hyogo, Japan

[21] Appl. No.: 365,797

[22] Filed: Apr. 5, 1982

[30] Foreign Application Priority Data

Apr. 13, 1981 [JP] Japan .................................. 56-56004

[51] Int. Cl.³ .............................................. G01L 5/16
[52] U.S. Cl. ................................ 73/862.04; 73/862.65
[58] Field of Search .......................... 73/862.04, 862.65

[56] References Cited

U.S. PATENT DOCUMENTS 2,848,892  8/1958  Hoffman ........................... 73/862.65
3,780,573 12/1973  Reus .................................. 73/862.04
3,985,025 10/1976  Ormond ............................ 73/862.65

FOREIGN PATENT DOCUMENTS 49-775978  1/1974  Japan .
52-133270 11/1977  Japan .

Primary Examiner—Anthony V. Ciarlante
Attorney, Agent, or Firm—Eugene E. Geoffrey, Jr.

[57] ABSTRACT

A device for measuring components of force and moment along and about three orthogonal axes, composed generally of a central hub portion, an annular rim portion and four radial spoke portions connecting the hub and rim portions and having strain gages adhered thereon for producing electric signals indicative of strains appearing therein, and typically used in a tire tester, wind tunnel balance and the like by fixing either the hub or rim portion and applying a force to the other, the improvement of which is its relatively simple structure and exclusion of mutual interference of the respective components in measurement.

3 Claims, 15 Drawing Figures

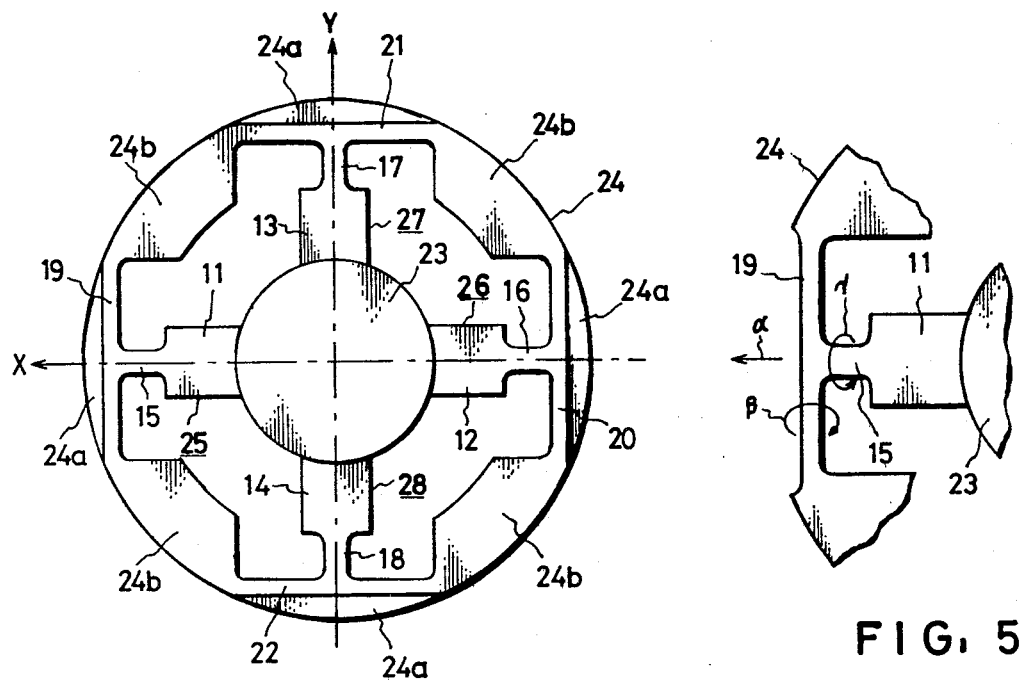
FIG. 4
FIG. 5
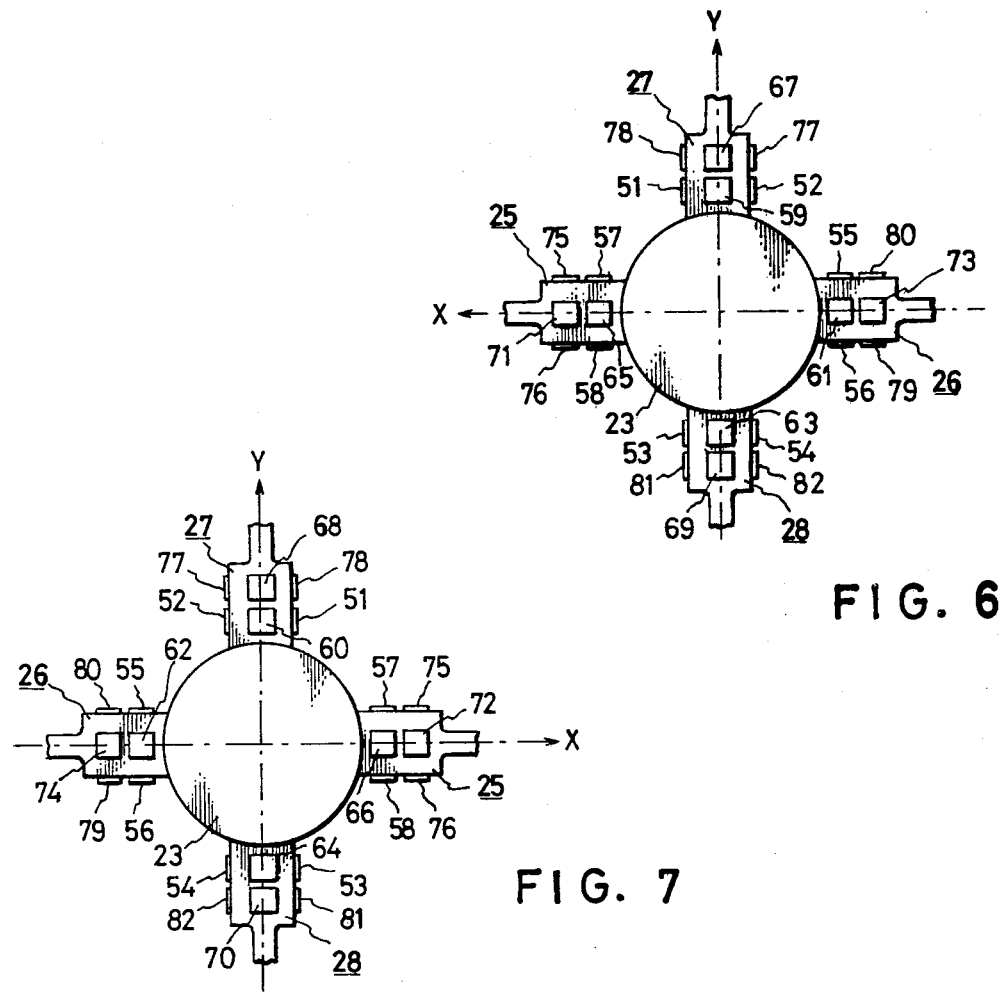
FIG. 6
FIG. 7

DEVICE FOR MEASURING COMPONENTS OF FORCE AND MOMENT IN PLURAL DIRECTIONS

This invention relates to a device for measuring components of force and moment in plural directions and especially to a device for measuring such components along and about three orthogonal axis. This device is typically useful in a tire tester, wind tunnel balance and the like.

Various devices and equipment have been proposed for measuring an applied force as its components in predetermined plural directions. Typical examples of such devices are disclosed in the registered Japanese Pat. No. 775,978 and the opened Japanese Patent Specification No. 52-133270 (patent application No. 51-50625), which are cited herein as references. As shown in these references, the device is composed generally of a central hub portion, a circular rim portion and four radial spoke portions connecting the hub and rim portions and having suitable strain gauges adhered thereon. When one of the hub or rim portions is fixed and a force is applied to the other, various strains will occur in the spoke portions to change the resistances of the respective strain gauges. Therefore, if the strain gauges are appropriately connected in a circuit, the strains and corresponding components of force can be detected in the directions of the spokes.

However, such prior art devices have disadvantages in that it is very difficult to measure a twisting moment applied to a specific spoke portion due to interference of deflections of the other portions, and that the device must become quite complicated and costly if one intends to overcome this trouble, as described in more detail later.

Accordingly, an object of this invention is to provide an improved structure of this type of measuring device, which is simple and easy to manufacture and enables measurement of the components of force and moment in the respective directions individually without interference of the other portions. This object can be fully attained by the device of this invention.

In accordance with this invention, a device is provided for measuring components of force and moment in plural directions, which comprises a central hub portion and a rigid annular rim portion. In case of measurement, one of these portions is fixed and a force is applied to the other. Four spoke portions extend outwardly from the hub portion to mutually orthogonal radial directions and each spoke portion has a rectangular cross-section with its width parallel to the radial plane and its height perpendicular to the radial plane. A chord member is coupled laterally at its midway to the top of each spoke portion and also coupled at each end to the rim portion. The chord member is designed to exhibit substantial flexibility with respect to a bending force in the extending direction of the corresponding spoke portion. In order to detect mechanical strains appearing in each spoke portion, a plurality of mechano-electric transducer elements are adhered to the surfaces of the spoke portion.

According to a feature of this invention, each spoke portion consists of a trunk section adjacent to the hub portion and an end section adjacent to the chord member an the width of the cross-section of the end section is significantly less than that of the trunk section, so that the end section exhibits substantial flexibility with respect to a twisting force about the extending direction of the spoke portion. The transducer elements are adhered to the four surfaces of the trunk section.

These and other features of this invention will be described in more detail hereunder with reference to the accompanying drawings.

IN THE DRAWINGS

FIG. 4 is a front view representing an embodiment of the device according to this invention;

FIG. 5 is a partial front view of the device of FIG. 4 given for an aid in explaining its operation;

FIGS. 6 and 7 are partial front and back views of the device of FIG. 4 representing locations of mechano-electric transducer elements adhered to the spoke portions thereof;

Throughout the drawings, like reference numerals are used to denote corresponding structural components.

Figure 1:
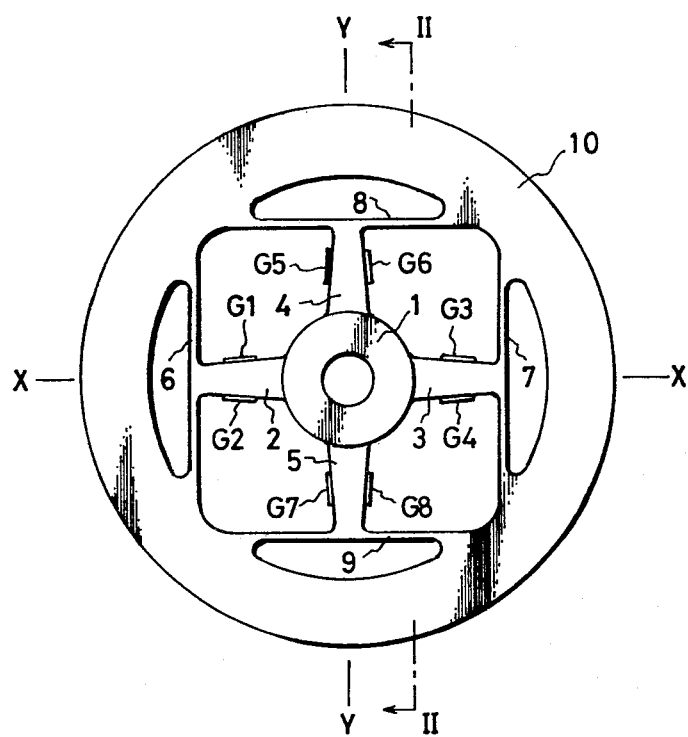
FIG. 1 is a front view representing an example of prior art devices.

A typical example of the prior art devices, which is disclosed in the aforementioned Japanese Pat. No. 775,978, is shown in FIG. 1. As shown in the drawing, it comprises a central hub portion 1, four spoke portions 2, 3, 4 and 5 extending outwardly from the hub portion 1, a rigid annular rim portion 10 and four chord members 6, 7, 8 and 9 coupled laterally at their midways to the tops of the spoke portions 2, 3, 4 and 5, respectively, and also coupled at both ends to the rim portion. These portions and members are preferably made in an integral body. Mechano-electric transducer elements, such as strain gauges, G1, G2, ... G8 are adhered to the side faces of the spoke portions 2, 3, 4 and 5, respectively, which sense tension and compression applied thereto as a change of electric resistance.

Taking now the X-axis in the extending direction of the spokes 2 and 3 and the Y-axis in the extending direction of the spokes 4 and 5, the Z-axis is perpendicular to the plane of paper, as shown in the drawing. When the rim portion 10 is fixed and a force is applied to the hub portion 1 along the X-axis, the spoke portions 2 and 3 are subject to tension and compression and the spoke portions 4 and 5 are subject to bending. However, the X-axis dimension or "width" of the chord members 6 and 7 is made significantly less than the Z-axis dimension or "height" so that the members 6 and 7 are sufficiently flexible with respect to the force along the X-axis. Therefore, this force applied to the hub portion 1 is almost spent as the bending force for the spoke portions 4 and 5 and can be sensed by the strain gauges G5, G6, G7 and G8. Similar to the chord members 6 and 7, the chord members 8 and 9 have "widths" significantly less than "heights" and are sufficiently flexible in the Y-direction. This results in the bending mode of the spoke portions 4 and 5 approximating a "cantilever" mode. Similarly, a force applied to the hub portion 1 along the Y-axis can be measured by means of the strain gauges G1, G2, G3 and G4. Thus, in general, the components of force in the X and Y directions can be measured without interference of the components of force in the Y and X directions, respectively, by this prior art device.

Figure 2:
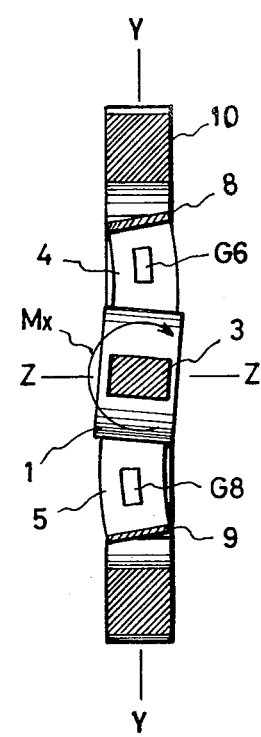
FIG. 2 is a sectional view taken along the line II—II of FIG. 1, representing an exaggerated state of deformation under a moment about the X-axis.

However, this device may suffer from significant trouble when a moment about the X and/or Y axis is applied to the hub portion 1. For example, as shown exaggeratedly in FIG. 2, the moment Mx about the X-axis will cause twisting of the spoke portions 2 and 3, as well as bending of the spoke portions 4 and 5 along the Z-axis. Various stresses and strains appearing in the spoke portions interfere mutually due to rigidity of the spoke portions and it is substantially impossible to measure the moment Mx by the method of sensing bending strains as described above.

Figure 3:
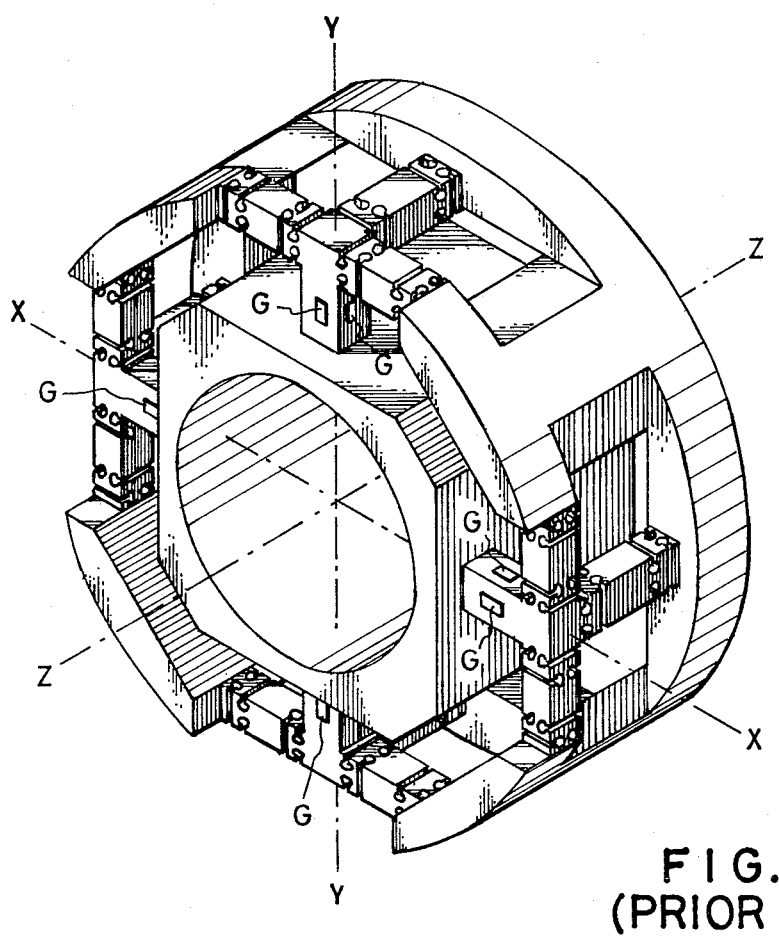
FIG. 3 is a perspective view representing another example of prior art devices.

The device of the abovementioned opened Japanese Patent Specification No. 52-133270 was proposed to overcome this trouble. The general structure of this device is shown in FIG. 3. As understood from the drawing, a number of flexure portions are provided for removing interference of the twisting force with the bending strain to enable measurement of the components of moment, as well as the components of force, about the three axis X, Y and Z individually by means of strain gauges G as shown, However, as readily anticipated from the drawing, this device is so complicated in structure that it is very difficult to manufacture and, therefore, relatively high in cost.

Next, an embodiment of the device according to this invention will be described with reference to the drawings of FIGS. 4 through 8. As shown in FIG. 4, the device of this invention comprises a central hub portion 23, a rigid annular rim portion 24, four radial spoke portions 25, 26, 27 and 28 and four chord members 19, 20, 21 and 22 coupled respectively at their midways to the spoke portions and both ends to the rim portion, the same as in the prior art of FIG. 1. However, in this inventive device, the spoke portions 25, 26, 27 and 28 are composed of trunk sections 11, 12, 13 and 14 and end sections 15, 16, 17 and 18, respectively, and each end section has a "width" dimension less than that of the corresponding trunk section, while both sections are substantially the same in "height" dimension, as aforementioned. The "width" of each end section of the spoke portion is sufficiently small to make it flexible with respect to the twisting force about the extending direction of the spoke portion.

Figure 8:
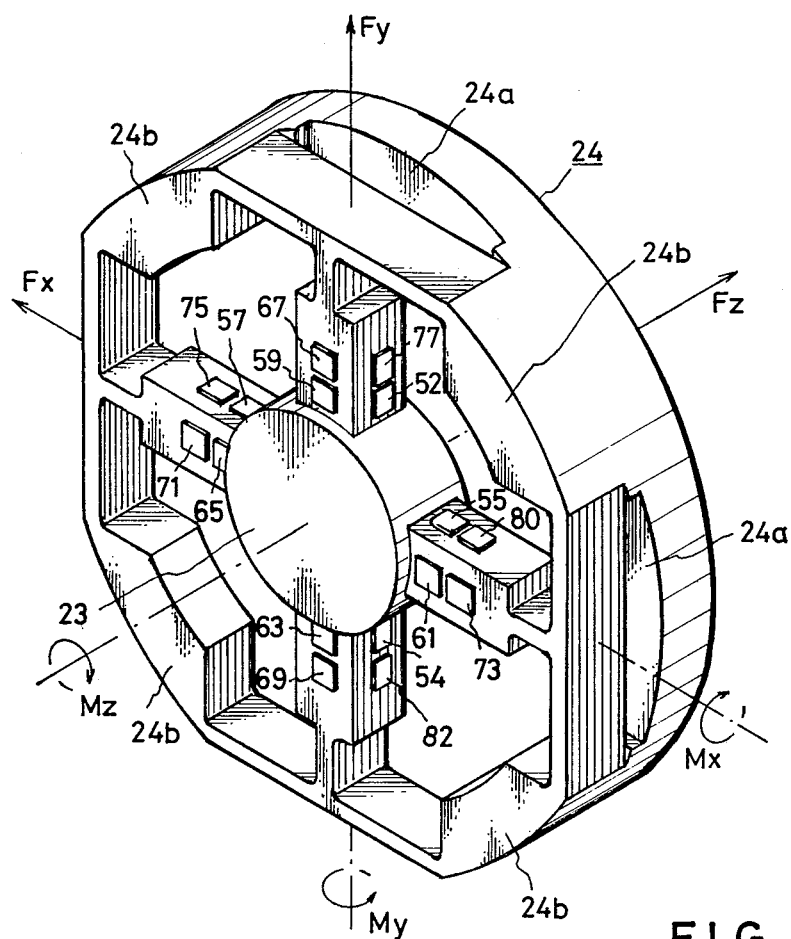
FIG. 8 is a perspective view of the device of FIG. 4.
Figure 10:
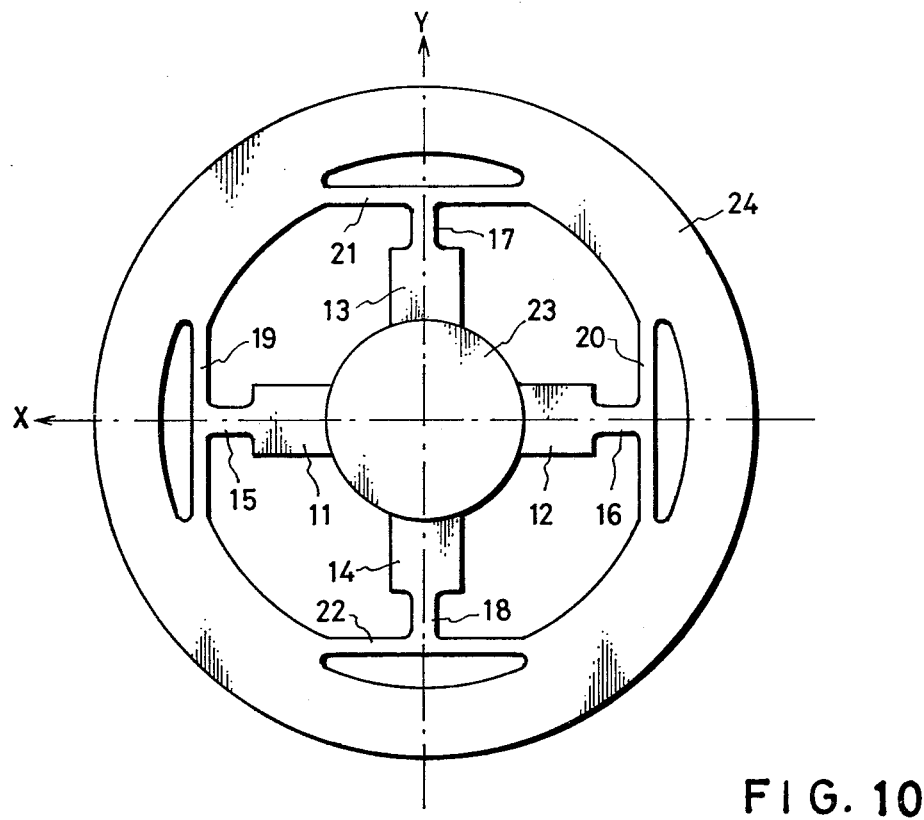
Figure 9A:
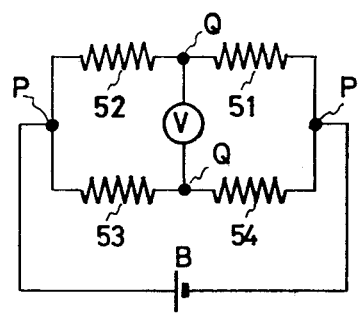
FIGS. 9a through 9f are circuit diagrams representing component force and moment measuring bridges according to this invention; and, FIG. 10 is a front view representing another embodiment of the device according to this invention.
Figure 9B:
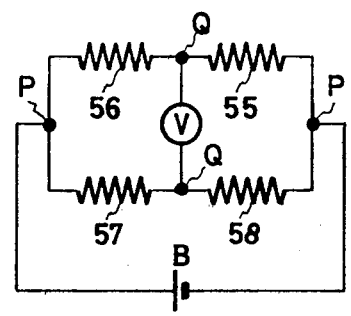
Figure 9C:
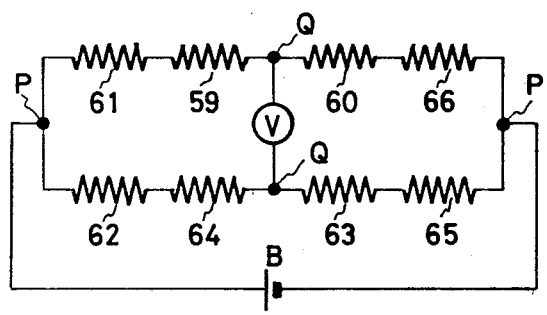
Figure 9D:
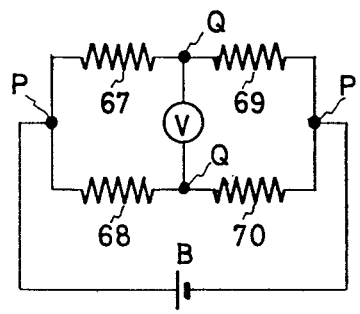
Figure 9E:
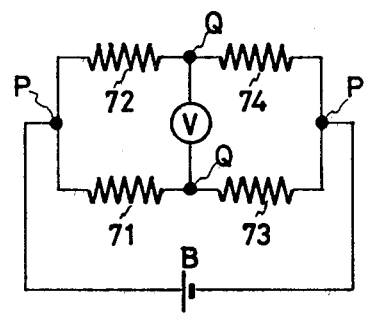
Figure 9F:
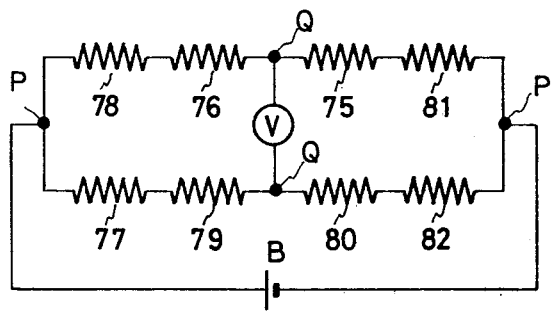

As shown more clearly in FIG. 8, the rim portion 24 includes four relatively thin base portions 24a and four relatively thick boss portions 24b extending forwardly along the Z-direction. The chord members 19, 20, 21 and 22 are bridged between the respective boss portions 24b with some clearance with respect to the base portions 24a. Of course, the shape of the rim portion 24 of the inventive device may be similar to that of the prior art device of FIG. 1, as shown in FIG. 10. However, it should be understood that the structure of FIGS. 4 and 8 has an advantage of reduced overall diameter of the device over the structure of FIG. 10.

As shown in FIG. 5 as an example, when the rim portion 24 is fixed and a force is applied to the hub portion 23, the chord member 19 is liable to deflect in the $\alpha$-direction under the X-component of force Fx and to twist in the $\beta$-direction under the Z-component of force Fz and the end section 15 of the spoke portion 25 is liable to twist in the $\gamma$-direction under the X-component of moment Mx, due to their reduced "width" dimensions as compared with their "height" dimensions, as previously mentioned. Accordingly, measurements of Fx and Mx are subject to almost no effect of the rigid trunk sections 11 and 12 of the spoke portions 25 and 26. As this is the case in each quadrant of the device, it is concluded that the X-components of force and moment Fx and Mx appear as bending strains in the spoke portions 27 and 28, the Y-components Fy and My appear as bending strains in the spoke portions 25 and 26 and the Z-components Fz and Mz appear as bending strains in the spoke portions 25 to 28. In order to sense these bending strains to measure the components of force and moment, strain gauges 51 through 82 are adhered to the trunk sections of the respective spoke portions 25, 26, 27 and 28, as shown in FIGS. 6 and 7. Although each of the strain gauges in this embodiment is of the type, such as wire strain gauge or semiconductor strain gauge, which senses strains of the surface as a change in its electric resistance, other types of mechano-electric conversion elements, such as piezo-electric elements may be utilized.

As shown in FIGS. 6 and 7, each of the four surfaces of the trunk section of each spoke portion carries two strain gauges arranged longitudinally thereon and each spoke portion includes eight strain gauges in total. These strain gauges are connected in separate six bridge circuits as shown in FIGS. 9a through 9f. The strain gauges 51 to 66 in the three bridges of FIGS. 9a, 9b and 9c belong to a first group adjacent to the hub portion 23, while the other gauges 67 to 82 in the three bridges of FIGS. 9d, 9e and 9f belong to a second group remote from the hub portion. Although, in the following description, the first and second groups are shown to be used for measuring the components of force Fx, Fy and Fz and the components of moments Mx, My and Mz, respectively, other connections can be considered easily by those skilled in the art. In each bridge circuit, a constant voltage is applied across terminals P from a voltage source B and a voltage change across junctions Q is measured by a voltmeter V.

As aforementioned, the component of force Fx appears as strains in the spoke portions 28 and 27, which are caused by co-sensed bendings along the X-axis of these spoke portions and sensed by the strain gauges 51, 52, 53 and 54 on both side surfaces thereof. In this case, the strain gauges 51 and 53 exhibit resistance changes opposite in polarity to the strain gauges 52 and 54, respectively. It can be understood that the connection of FIG. 9a has been made in the differential mode for obtaining the greatest change of voltage across the junctions Q. Similarly, the component of force Fy is measured by means of the strain gauges 55, 56, 57 and 58 on both side surfaces of the spoke portions 26 and 25 through the bridge circuit of FIG. 9b. The component of force Fz appears as strains in all the spoke portions, which are caused by co-sensed bendings along the Z-axis of these spoke portions and, therefore, sensed by the strain gauges 59 to 66 on the front and rear surfaces of them, through the bridge circuit of FIG. 9c. It is also understood that this bridge is constructed also to obtain a greatest voltage change at the voltmeter V.

On the other hand, the component of moment Mx appears as strains in the spoke portions 27 and 28, which are caused by counter-sensed bendings along the Z-axis of these spoke portions and sensed by the strain gauges 67, 68, 69 and 70 on the front and rear surfaces thereof. In this case, the strain gauges 67 and 70 exhibit resistance changes opposite in polarity to the strain gauges 68 and 69, respectively. Therefore, the bridge connection of FIG. 9d can provide a greatest voltage change at the voltmeter V. Similarly, the component of moment My is measured by means of the strain gauges 71, 72, 73 and 74 on the front and rear surfaces of the spoke portions 25 and 26 through the bridge circuit of FIG. 9e. The component of moment Mz appears as strains in all the spoke portions, which are caused by counter-sensed bendings along the Y-axis of the spoke portions 25 and 26 and counter-sensed bendings along the Y-axis of the spoke portions 27 and 28 and sensed by the strain gauges 75 to 82 on both side surfaces of all the spoke portions through the bridge circuit of FIG. 9f which is also constructed to provide a greatest voltage change.

As understood from the above description, each of the strain gauges is used exclusively for measurement of each of the six components Fx, Fy, Fz, Mx, My and Mz but not common to two or more components. Moreover, these six components are measured respectively with the six separate bridge circuits as shown in FIGS. 9a through 9f. Accordingly, it is possible to measure any two or more components at the same time with no interference of the other components.

It should be understood that various modifications and changes can be made by those skilled in the art within the scope of this invention as defined in the appended claims. For example, the annular rim portion 24 may be square in shape, though it has been described to be generally circular.

What is claimed is:

1. A device for measuring components of force and moment in plural directions, comprising a central hub portion, a rigid annular rim portion, a plurality of spoke portions extending outwardly from said hub portion with pairs of spoke portions positioned in mutually orthogonal radial directions and each having a rectangular cross-section with its width dimension parallel to the radial plane and its height dimension perpendicular to said radial plane, a plurality of chord portions each coupled laterally at its midway to the top to one of said spoke portions and also coupled at both ends to said rim portion for exhibiting substantial flexibility with respect to a bending force applied thereto along the extending direction of said spoke portion, and a plurality of strain detecting mechano-electric conversion elements attached to said spoke portions; wherein each of said spoke portions consists of a trunk section adjacent to said hub portion and an end section adjacent to said chord portion, the width dimension of said end section being substantially less than that of said trunk section, substantially uniform in width throughout its length and symetrical about the axis of the associated trunk section whereby said end section exhibits substantial flexibility with respect to a twisting force applied thereto about the extending direction of said spoke portion, and said conversion elements are adhered to the four surfaces of said trunk sections.

2. A device, according to claim 1, wherein each of said spoke portions includes eight mechano-electric conversion elements adhered to its trunk section, four of which are used for measuring the components of force and the other four of which are used for measuring the components of moment.

3. A device, according to claim 1, wherein said hub portion, rim portion, spoke portions and chord portions are formed integrally one with the others.

* * * * *